United States Patent
Oh et al.

(10) Patent No.: US 6,478,257 B1
(45) Date of Patent: Nov. 12, 2002

(54) PHASE CHANGE MATERIAL THERMAL CONTROL FOR ELECTRIC PROPULSION

(75) Inventors: David Oh, Sunnyvale, CA (US); Lenny Low, Hillsborough, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 31 days.

(21) Appl. No.: 09/881,942

(22) Filed: Jun. 15, 2001

(51) Int. Cl.[7] .................................................. B64G 1/46
(52) U.S. Cl. .............................. 244/158 A; 244/158 R; 244/172
(58) Field of Search .................................. 244/172, 169, 244/158 A, 158 R, 163

(56) References Cited

U.S. PATENT DOCUMENTS

| | | | |
|---|---|---|---|
| 3,067,594 A | * | 12/1962 | Bland et al. |
| 3,075,361 A | * | 1/1963 | Lindberg |
| 3,103,885 A | * | 9/1963 | McLauchlan |
| 4,986,495 A | * | 1/1991 | Stromath et al. |
| 5,149,018 A | * | 9/1992 | Clark |
| 5,271,454 A | * | 12/1993 | Leidinger |
| 5,687,932 A | * | 11/1997 | Gomes |
| 5,787,969 A | * | 8/1998 | Drolen et al. |
| 5,794,890 A | * | 8/1998 | Jones et al. |

* cited by examiner

Primary Examiner—Peter M. Poon
Assistant Examiner—Tien Dinh
(74) Attorney, Agent, or Firm—Kenneth W. Float

(57) ABSTRACT

Systems and methods that employ a phase change material to provide thermal control of electric propulsion devices (thrusters). A spacecraft is configured to have an electric propulsion thruster. The electric propulsion thruster is surrounded with a phase change material. Suitable phase change materials include high-density polyethylene (HDPE), waxes, paraffin materials, and eutectic salts. The spacecraft is launched into orbit. The electric propulsion thruster is fired for a predetermined period of time. Heat generated by the electric propulsion thruster is absorbed and stored in the phase change material while the thruster is firing. The stored heat is dissipated into space after the thruster has stopped firing.

12 Claims, 1 Drawing Sheet

PHASE CHANGE MATERIAL THERMAL CONTROL FOR ELECTRIC PROPULSION

BACKGROUND

The present invention relates generally to satellites or spacecraft, and more specifically, to systems and methods that employ phase change materials to provide thermal control for electric propulsion devices.

The assignee of the present invention manufactures and deploys spacecraft or satellites into geosynchronous and low earth orbits. Electric propulsion systems are used for stationkeeping functions while the spacecraft is in orbit.

Previously known methods for controlling the temperature of electric propulsion systems use a dedicated radiator panel to radiate heat into space while the thruster is firing. This requires a relatively large radiator panel. The more heat that is generated, the larger the required radiator panel must be.

Prior art references disclose the use of phase change materials for batteries, electronic units and for thermal hardening of critical spacecraft components such as solar cells against laser attack from ground or space borne antisatellite weapons. Other prior art references discusses use of phase change materials as an augmentation to existing passive thermal control sub-system to reduce diurnal temperature swings.

Use of phase change materials sandwiched between heat pipe panels has also been suggested. In general, phase change materials could be used with any thermal system with a variable thermal load. However, in none of the prior art references has there been any disclosure regarding the use of phase change materials in conjunction with thermal management of electric propulsion systems. It has been determined by the present inventors that there are advantages in using phase change materials for thermal control of electric propulsion systems during north/south stationkeeping operations.

It would be advantageous to significantly reduce the size of, or eliminate, the radiator panel used in conventional thermal control systems and methods that are used with electric propulsion systems. Since the radiator panel is usually large and heavy, by eliminating or significantly reducing its size, some mass can be saved.

In addition, the large radiator panel causes other thermal, structure and configuration problems. It would be advantageous to reduced or eliminate these problems. The large radiator panel causes thermal blockage and a backload on other spacecraft radiator panels. If the radiator panel can be eliminated, then the overall thermal performance of the spacecraft is increased.

Accordingly, it is an objective of the present invention to provide for systems and methods that employ phase change materials to provide thermal control for electric propulsion devices.

SUMMARY OF THE INVENTION

To accomplish the above and other objectives, the present invention provides for systems and methods that employ a phase change material to provide thermal control of electric propulsion devices (electric propulsion thrusters). The present invention thus provides for a compact, low mass system for dissipating heat created by electric propulsion thrusters.

The present invention uses a phase change material surrounding an electric propulsion thruster, and optionally components surrounding the thruster, to absorb and store the heat that is generated as latent heat while the thruster is firing. Exemplary phase change materials include high-density polyethylene (HDPE), waxes, paraffin materials, and eutectic salts, for example.

The latent heat is dissipated into space, such as by using a relatively small radiator or no radiator at all, after the thruster has stopped firing. The present invention thus controls the temperature of the thruster and surrounding components without using a large radiator panel.

An exemplary method for using a phase change material to provide thermal control for an electric propulsion thruster comprises the following steps. A spacecraft is configured to have an electric propulsion thruster. The electric propulsion thruster is surrounded with a phase change material. The spacecraft is launched into orbit.

When in orbit, the electric propulsion thruster is fired for a predetermined period of time, such as during a stationkeeping maneuver, for example. Heat generated by the electric propulsion thruster is absorbed and stored in the phase change material while the thruster is firing. The stored heat is dissipated into space after the thruster has stopped firing.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
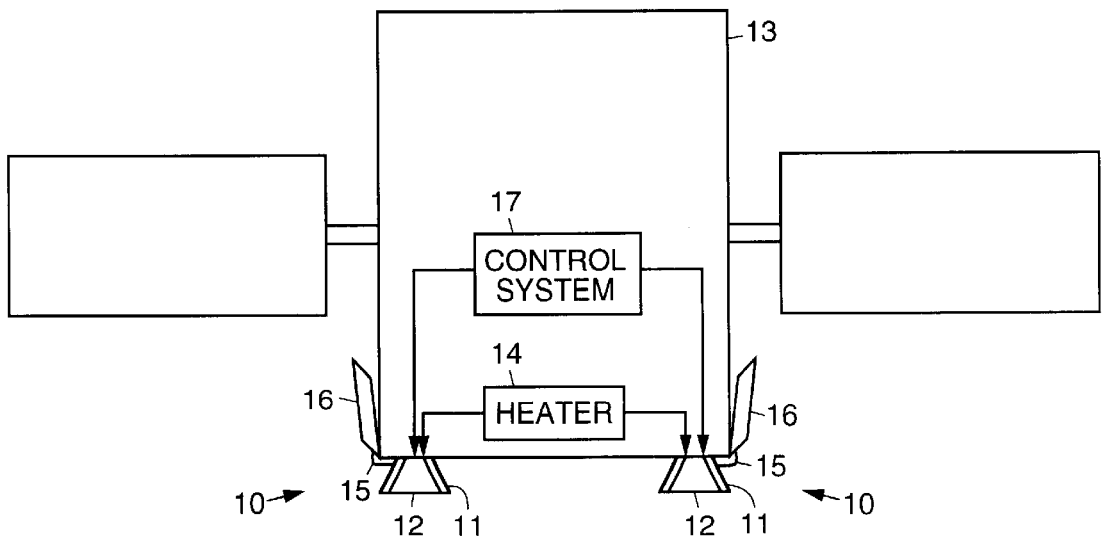
FIG. 1 illustrates an exemplary system in accordance with the principles of the present invention that employs a phase change material to provide thermal control for electric propulsion devices.

Referring to the drawing figures, FIG. 1 illustrates an exemplary system 10 in accordance with the principles of the present invention that employs a phase change material 11 to provide for thermal control of electric propulsion devices (thrusters) 12. The exemplary system 10 is used on a spacecraft 13.

The spacecraft 13 comprises a plurality of electric propulsion thruster 12 that are used for stationkeeping maneuvers. The phase change material 11 is disposed so as to surround each electric propulsion thruster 12 on the spacecraft 13. Optionally, components surrounding the thruster 12 may be surrounded by the phase change material 11.

The phase change material 11 absorbs and stores heat that is generated as latent heat while the thruster 12 is fired, such as under control of a control system 17. Exemplary phase change materials 11 include high-density polyethylene (HDPE), waxes, paraffin materials, and eutectic salts, for example.

The phase change material 11 surrounding the thruster 12 may be coupled by way of a heat pipe 15, for example, to a relatively small radiator panel 16. In certain instances where the amount of heat generated by the thruster 13 is relatively small, the heat pipe 15 and radiator panel 16 are not required. In any event, the heat stored in the phase change material 11 during thruster firing is dissipated into space after the thruster 12.

Although the thrusters 12 dissipate a significant amount of heat when firing, the thrusters 12 are nonoperational for most of the operating lifetime of he spacecraft 13. A single thruster 12 may operate for only one hour out of each 24-hour period.

During times when the thruster 12 is non-operational, one or more heaters 14 are employed to keep the thrusters 12 above a required temperature. The required heater power is proportional to the size of the radiator panel 16 that is needed. By reducing the size of the radiator panel 16, or eliminating the radiator panel 16 entirely, the heater power is reduced.

Electric propulsion devices 12 consume kilowatts of power in a relatively small package. A pair of electric thrusters 12 operating at the same time may dissipate several hundred watts of heat and reach temperatures in excess of 300° C. This heat needs to be removed to keep the thruster 12 and the spacecraft 13 at nominal temperatures during times when the thruster 12 is operational.

The present invention uses a the change material 11 to absorb and store the heat generated by the thruster 12 during firing. The phase change material 11 is used because it provides a relatively efficient mechanism for storing energy. For example, a thruster 12 generating a 100 Watt heat load for an hour would generate 360 kJ of energy. A phase change material 11, such as high-density polyethylene (HDPE), for example, has a latent heat of 210 kJ/kg and a melting point of 140° C. Use of the high-density polyethylene phase change material 11 results in a mass of roughly 1.6 kg, which is less than a typical radiator panel 16.

Figure 2:
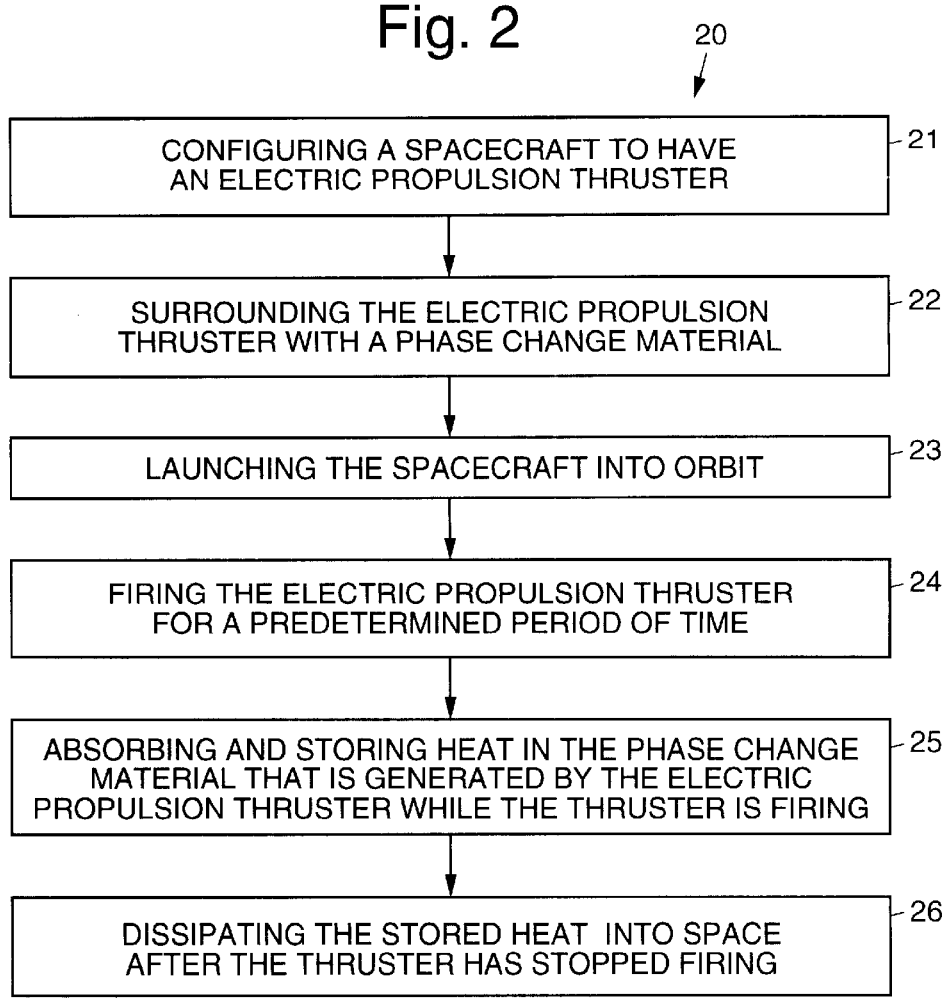
FIG. 2 is a flow diagram that illustrates an exemplary method in accordance with the principles of the present invention of using a phase change material to provide thermal control for electric propulsion devices.

FIG. 2 is a flow diagram that illustrates an exemplary method 20 in accordance with the principles of the present invention of using a phase change material 11 to provide thermal control for an electric propulsion device 12 or thruster 12. The exemplary method 20 comprises the following steps.

A spacecraft 13 is configured 21 to have an electric propulsion thruster 12. The electric propulsion thruster 12 is surrounded 22 with a phase change material 11. The spacecraft 13 is launched 23 into orbit. The electric propulsion thruster 12 is fired 24 for a predetermined period of time, such as during a stationkeeping maneuver, for example. Heat generated by the electric propulsion thruster 12 is absorbed and stored 25 in the phase change material 11 while the thruster 12 is firing. The stored heat is dissipated 26 into space after the thruster 12 has stopped firing.

The present invention significantly reduces the size of, or eliminates, the radiator panel used in conventional thermal control systems and methods for use with electric propulsion systems. Use of the present invention reduces the size of, or eliminates, the radiator panel, which results in mass savings.

Use of the present invention reduces or eliminates many thermal, structure and configuration problems. Use of the present invention reduces or eliminates thermal blockage and backload on other spacecraft radiator panels, thus increasing the overall thermal performance of the spacecraft.

Use of the present invention reduces or eliminates potential blockage of the field of view of sensors or antenna apertures. In addition, use of the present invention helps to optimize the structural design of the spacecraft.

Thus, a dimensionally stable honeycomb core for use in spacecraft applications has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A spacecraft comprising:

an electric propulsion device disposed on the spacecraft;

a phase change material surrounding the electric propulsion device;

apparatus for firing the electric propulsion thruster for a predetermined period of time;

and wherein heat generated by the electric propulsion device is absorbed and stored in the phase change material while the thruster is firing and dissipated into space after the device has stopped firing.

2. The spacecraft recited in claim 1 wherein the electric propulsion device comprises an electric propulsion thruster.

3. The spacecraft recited in claim 1 wherein the phase change material comprises high-density polyethylene.

4. The spacecraft recited in claim 1 wherein the phase change material comprises wax.

5. The spacecraft recited in claim 1 wherein the phase change material comprises paraffin.

6. The spacecraft recited in claim 1 wherein the phase change material comprises eutectic salt.

7. A method for providing thermal control of an electric propulsion device, comprising the steps of:

configuring a spacecraft to have an electric propulsion thruster;

surrounding the electric propulsion thruster with a phase change material;

launching the spacecraft into orbit;

firing the electric propulsion thruster for a predetermined period of time;

absorbing and storing heat generated by the electric propulsion thruster in the phase change material while the thruster is firing; and dissipating the stored heat into space after the thruster has stopped firing.

8. The method recited in claim 7 wherein the electric propulsion device comprises an electric propulsion thruster.

9. The method recited in claim 7 wherein the phase change material comprises high-density polyethylene.

10. The method recited in claim 7 wherein the phase change material comprises wax.

11. The method recited in claim 7 wherein the phase change material comprises paraffin.

12. The method recited in claim 7 wherein the phase change material comprises eutectic salt.

* * * * *